(12) United States Patent
Chopra et al.

(10) Patent No.: US 10,394,658 B1
(45) Date of Patent: Aug. 27, 2019

(54) HIGH SPEED SNAPSHOTS MECHANISM

(71) Applicant: EMC IP Holding Company LLC, Hopkinton, MA (US)

(72) Inventors: Shelesh Chopra, Bangalore (IN); Vladimir Mandic, San Jose, CA (US); John Rokicki, Rutland, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 556 days.

(21) Appl. No.: 14/968,431

(22) Filed: Dec. 14, 2015

(51) Int. Cl.
*G06F 11/14* (2006.01)
*G06F 16/11* (2019.01)

(52) U.S. Cl.
CPC ...... *G06F 11/1448* (2013.01); *G06F 11/1461* (2013.01); *G06F 16/128* (2019.01); *G06F 2201/84* (2013.01)

(58) Field of Classification Search
CPC ............. G06F 11/1451; G06F 11/1461; G06F 16/128; G06F 2201/84
USPC ........................... 707/639, 999.202, 999.204
See application file for complete search history.

(56) References Cited

U.S. PATENT DOCUMENTS

| 7,165,082 | B1 | 1/2007 | Devos | |
|---|---|---|---|---|
| 7,647,466 | B1 | 1/2010 | Rao | |
| 8,495,304 | B1 * | 7/2013 | Natanzon | G06F 11/1453 711/133 |
| 8,595,237 | B1 * | 11/2013 | Chaudhary | G06F 16/316 707/741 |
| 8,793,222 | B1 | 7/2014 | Stringham | |
| 8,898,144 | B2 * | 11/2014 | Allen | G06F 17/30442 707/613 |
| 9,015,122 | B2 | 4/2015 | Harrison | |
| 9,104,331 | B2 * | 8/2015 | Hsu | G06F 11/1438 |
| 9,110,604 | B2 * | 8/2015 | Hsu | G06F 3/0655 |
| 9,298,633 | B1 * | 3/2016 | Zhao | G06F 12/0862 |
| 9,569,446 | B1 * | 2/2017 | Feathergill | G06F 17/30088 |
| 9,626,252 | B1 * | 4/2017 | Chopra | G06F 11/1458 |
| 2005/0216788 | A1 * | 9/2005 | Mani-Meitav | G06F 11/1456 714/6.32 |
| 2006/0271604 | A1 | 11/2006 | Shoens | |
| 2007/0043790 | A1 | 2/2007 | Kryger | |
| 2008/0059733 | A1 | 3/2008 | Otani | |
| 2008/0294605 | A1 | 11/2008 | Prahlad | |
| 2010/0185592 | A1 | 7/2010 | Kryger | |
| 2011/0145199 | A1 * | 6/2011 | Prasad Palagummi | G06F 11/1435 707/654 |
| 2012/0166390 | A1 | 6/2012 | Merriman | |
| 2012/0215745 | A1 | 8/2012 | Prahlad | |
| 2014/0181027 | A1 | 6/2014 | Whitehead | |
| 2014/0201154 | A1 | 7/2014 | Varadharajan | |
| 2014/0280398 | A1 * | 9/2014 | Smith | G06F 9/544 707/825 |

OTHER PUBLICATIONS

Chopra et al., U.S. Appl. No. 14/222,971, filed Mar. 24, 2014.

(Continued)

*Primary Examiner* — Dennis Truong
(74) *Attorney, Agent, or Firm* — Van Pelt, Yi & James LLP (57) ABSTRACT

Backup storage is configured to automatically take one or more snapshots of a protected device. After a plurality of snapshots of the protected device have been automatically taken by the backup storage, the backup storage is communicated with in order to catalog metadata associated with the plurality of snapshots.

19 Claims, 7 Drawing Sheets

(56) References Cited

OTHER PUBLICATIONS

Fu et al., Application-Aware Client-Side Data Reduction and Encryption of Personal Data in Cloud Backup Services, Journal of Computer Science Technology 28.6, Nov. 2013, pp. 1012-1024.

* cited by examiner

HIGH SPEED SNAPSHOTS MECHANISM

BACKGROUND OF THE INVENTION

Snapshots are copied images of storage volume data and are a type of data protection technique because a snapshot permits a user, if desired, to restore the volume data to the point in time when snapshot was created. Going forward, Continuous Data Protection (CDP) and Storage Integrated Data Protection (SIDP) require even more frequent snapshots to be taken. New data protection techniques which improve the performance of the system would be desirable in light of CDP, SIDP, and other snapshot-intensive protection techniques.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
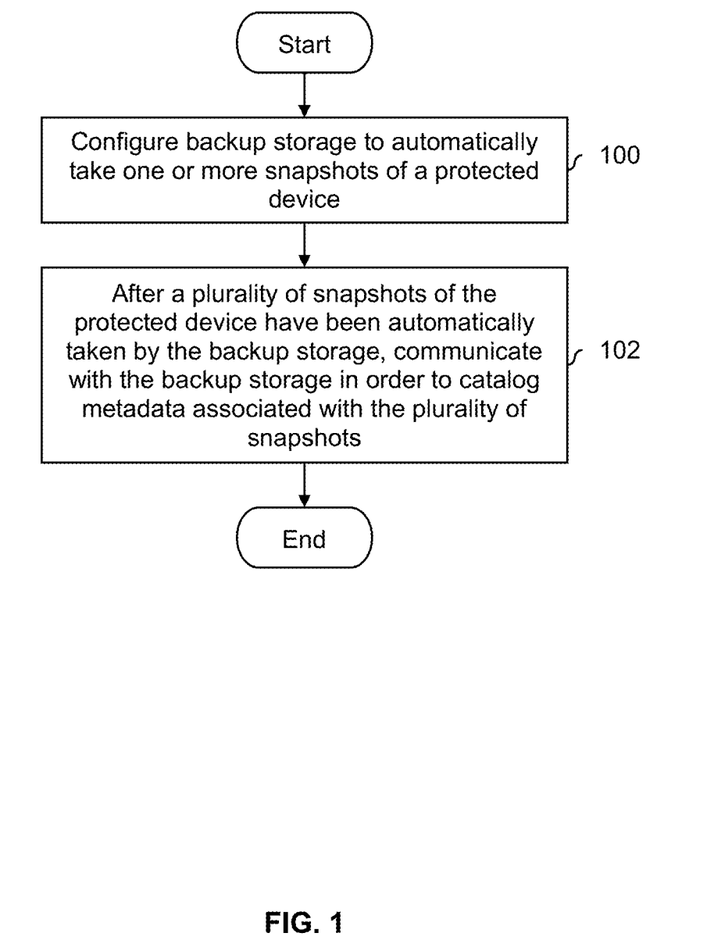
FIG. 1 is a flowchart illustrating an embodiment of a process for performing a backup using a smart snap controller and intelligent backup storage.

FIG. 1 is a flowchart illustrating an embodiment of a process for performing a backup using a smart snap controller and intelligent backup storage. In some embodiments, the process of FIG. 1 is performed by a smart snap controller. As will be described in more detail below, in some embodiments, a smart snap controller is a separate system from a backup server (i.e., they do not have to be co-located) and the smart snap controller controls backup storage (e.g., which may include multiple storage devices/arrays, different types of storage/arrays, etc.) which is capable of independently and/or automatically taking snapshots of a protected device.

At 100, backup storage is configured to automatically take one or more snapshots of a protected device. As used herein, the term "backup storage" includes any type of storage used for backup, including (but not limited to) storage arrays and purpose built backup appliances. In embodiments described herein, the storage device(s) which work with a smart snap controller are intelligent, in the sense that they are able to automatically and/or independently take snapshots of a protected device. For example, at step 100, the smart snap controller (generally speaking) configures the storage device so that the storage devices knows when to take a snapshot of the protected device (e.g., without further intervention or direction from the smart snap controller). Depending upon the interface exposed by the backup storage, the smart snap controller may configure the backup storage in a variety of ways. Some examples of how the storage device is configured at step 100 are described in more detail below.

In some embodiments, a snapshot automatically taken by a storage device is a CDP type of snapshot. In some such embodiments, when a snapshot is automatically taken by the storage device, a bookmark is created. Similarly, other types of snapshots or backups may require other information or objects to be saved or otherwise created, and the storage device saves or otherwise creates such information or objects.

At 102, after a plurality of snapshots of the protected device have been automatically taken by the backup storage, the backup storage is communicated with in order to catalog metadata associated with the plurality of snapshots. For example, suppose the smart snap controller is configured to catalog metadata according to some cataloging schedule or cataloging frequency. The cataloging schedule (frequency) may be calculated (e.g., in light of the snapshot schedule (frequency)) so that there are at least two snapshots to be cataloged when the smart snap controller contacts the storage device to begin cataloging. For example, if the snapshot frequency is 1 snapshot/day, then the cataloging frequency may be set to 1 cataloging/2 days so that there are always exactly two snapshots (at least in this example) to be cataloged each time the smart snap controller initiates cataloging.

In some embodiments, the smart snap device outputs the cataloged metadata to some area or storage that is also accessible to the backup server. For example, the backup server may have a backup and restore application or service running on it. The backup and restore application may access such a shared cataloged metadata space in order to display (e.g., to a user) what snapshots/backups are available for restoration and (if so instructed) use the cataloged metadata to restore a selected snapshot/backup to a selected protected device.

Generally speaking, when a storage device takes a snapshot but before the metadata associated with that snapshot has been cataloged by the smart snap device, the system is in a state where that data has been protected (e.g., because the snapshot has been taken), but the system is not in a state where the snapshot is available as a restoration option. To put it another way, in order for a backup (e.g., corresponding to a given snapshot) to be a possible restoration point, the metadata associated with that particular snapshot has to be cataloged. As an example, without the metadata being cataloged at step 102, the backup system would not know the time at which the snapshot was taken, would not know where the corresponding backup data is stored on the storage device (e.g., if a restoration were desired), and would not know where such restored data should be restored to on the protected device. These are some examples of what the step of cataloging the metadata at step 102 gleans or otherwise yields in order for a corresponding snapshot to be make available for restoration.

One benefit to the process of FIG. 1 is that the system operates more efficiently because I/O or other connection resources are not tied up with the same frequency (schedule) as the snapshot frequency (schedule), which can be very frequent if CDP or SIDP is being supported. For example, suppose the smart snap controller and backup storage communicate through some network which is shared with other devices (e.g., production and/or operational devices), such as the protected device itself. With some other systems/techniques, network bandwidth resources would be tied up every time a snapshot needs to be taken because the storage device would need to be explicitly instructed to take a snapshot every time a snapshot is desired. This would affect the bandwidth available to the protected device and users in general. However, since the storage device is configured to automatically take snapshots (e.g., without intervention), this frees up bandwidth for other devices or users.

Another benefit to the process of FIG. 1 is that by decoupling when snapshots are taken and when the metadata is cataloged (which takes significantly more time than taking the snapshot), cataloging may be scheduled for times when there is more network bandwidth available without affected the frequency with which the protected device is backed up. For a variety of reasons (e.g., employees in different countries with very different time zones, regularly scheduled swing-shift or graveyard-shift employees, long work days, etc.) it may be that the network is very busy at almost all hours during the weekday. However, the network might be less busy during the weekend, and cataloging may be scheduled for this time when there is more bandwidth available and/or fewer users or other devices would be affected. However, snapshots of the protected device could still be taken on a fairly frequent basis (e.g., hourly) so that a high level of protection could still be achieved. In other words, this approach reduces the time needed for formal time-to-protect of any protected device.

Figure 2:
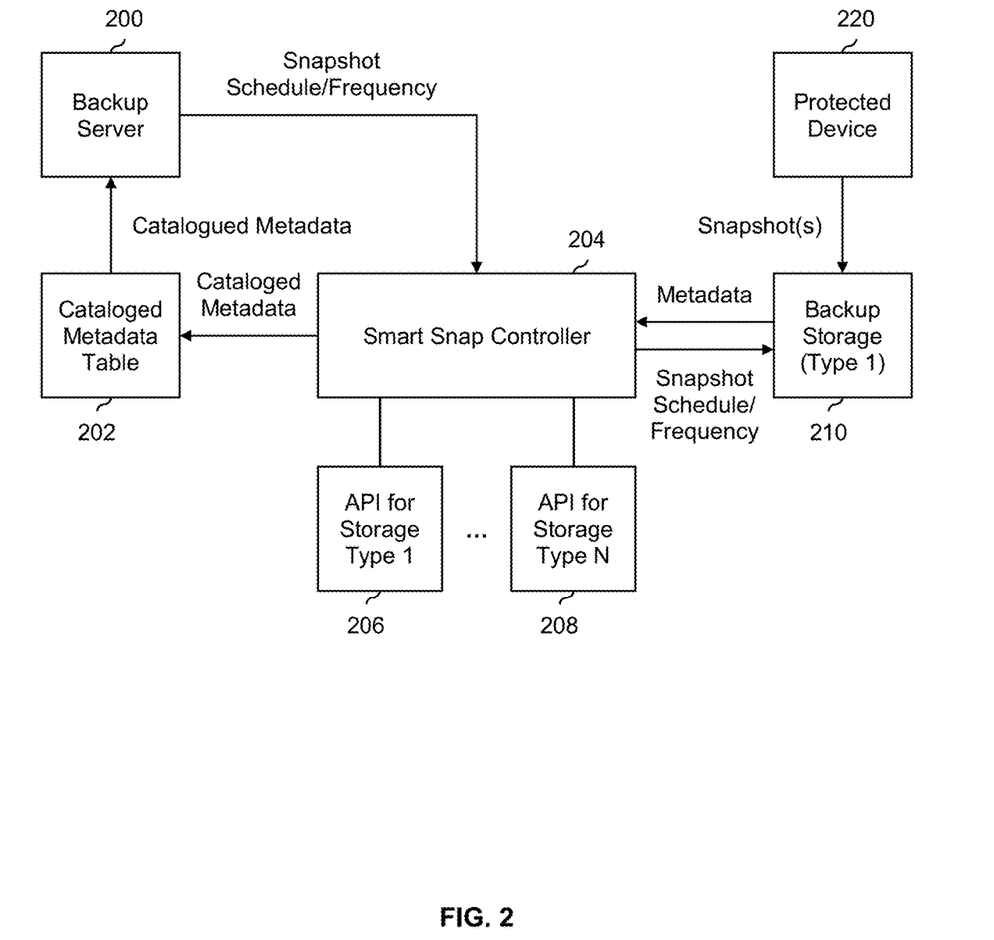
FIG. 2 is a system diagram illustrating an embodiment of a backup system which includes a smart snap controller and intelligent backup storage.

The following figure shows an exemplary system which performs the process of FIG. 1 and illustrates some others benefits to the technique(s) described herein.

FIG. 2 is a system diagram illustrating an embodiment of a backup system which includes a smart snap controller and intelligent backup storage. To preserve the readability of the figure, devices are shown as being directly connected to each other (e.g., without having to go through a network). In actuality, the device(s) may communicate with one another through any number and/or type of networks, protocols, etc.

Backup server 200 is the device via which instructions (e.g., related to backup and/or restoration) from a user are received. For example, backup server 200 may receive instructions from the user about how frequently backups should be performed. Similarly, any queries about available backups and restoration instructions may be received at backup server 200. Backup server 200 may use any appropriate interface to obtain a snapshot schedule or snapshot frequency from a user.

Backup server 200 informs smart snap controller 204 how frequently snapshots of protected device 220 should be taken, per the user's specifications. In some embodiments, backup server 200 passes the information unaltered to smart snap controller 204 and smart snap controller 204 determines how best to "fit" the user's specification into the interface exposed by the particular storage type (e.g., via the appropriate API).

In this example, the backup storage (210) is of a first type. Smart snap controller 204 has access to a plurality of application program interfaces (APIs), such as API 206 (associated with a first type of storage device) and API 208 (associated with an $N^{th}$ type of storage device). Since backup storage 210 is of the first type, API 206 is selected.

Using API 206, smart snap controller 204 configures backup storage 210 to automatically take snapshots of protected device 220. For example, some snapshot schedule or snapshot frequency may be set in backup storage 210 by smart snap controller 204. Once configured, backup storage 210 automatically takes snapshots of protected device 220 according to the snapshot frequency or snapshot schedule set by smart snap controller 204. Other settings or configurations may also be set, such as copy expiration time or other searchable metadata.

It is noted that although the signal from backup server 200 to smart snap controller 204 and the signal from smart snap controller 204 to backup storage 210 are both labeled "snapshot schedule/frequency," the format and/or value of the two signals may be different. For example, the smart snap controller 204 may need to specify a field which is not specified by backup server 200 (e.g., CDP type of snapshots?) or vice versa (e.g., ignore a field specified by the backup server for which the API has no corresponding field).

Protected device 220 is the device being backed up. For example, it may a device on which transactions (e.g., sales) occur and thus the information associated with the transactions must be backed up in case protected device 220 goes down. Some examples of the communications exchanged between smart snap controller 204 and backup storage 210 in order to configure automatic and/or independent snapshots are described in more detail below.

In this example, smart snap controller 204 accesses backup storage 210 to catalog the metadata stored thereon according to a cataloging frequency or cataloging schedule. In some embodiments, the cataloging frequency or cataloging schedule is not set or otherwise specified by the user or the backup server but is rather determined by smart snap controller 204 based on the snapshot frequency or snapshot schedule (e.g., so that there are always at least two snapshot to be processed when cataloging is performed).

In this example, the output of the cataloging process is written to or otherwise stored in cataloged metadata table 202, to which both smart snap controller 204 and backup server 200 have access to. Backup server 200 accesses cataloged metadata table 202 in order to (as an example) let users know what snapshots/backups are available for restoration, if desired, in order to restore a selected snapshot/backup, etc. As such, cataloged metadata table 202 is accessible to both backup server 200 and smart snap controller 204.

In order to clearly describe the technique, this figure shows only a single storage device. It is noted that other embodiments may include multiple storage devices, including different types of storage devices (e.g., which the smart snap controller communicates with using a corresponding API).

As shown here, one benefit of this system is that it is flexible and is capable of supporting new types of storage device. To add support for a new type of storage or an existing type of storage with new capabilities, a corresponding API would be created and made available to smart snap controller 204. It is noted that even if smart snap controller 204 were taken down temporarily (e.g., in order to install a new API), snapshots of protected device 220 would still be taken because backup storage 210 does not require direction or intervention from smart snap controller 204 in order to take a snapshot. This allows more time to upgrade smart snap controller 204 and provides continued data protection even if smart snap controller 204 or backup server 200 went down unexpectedly.

Figure 3:
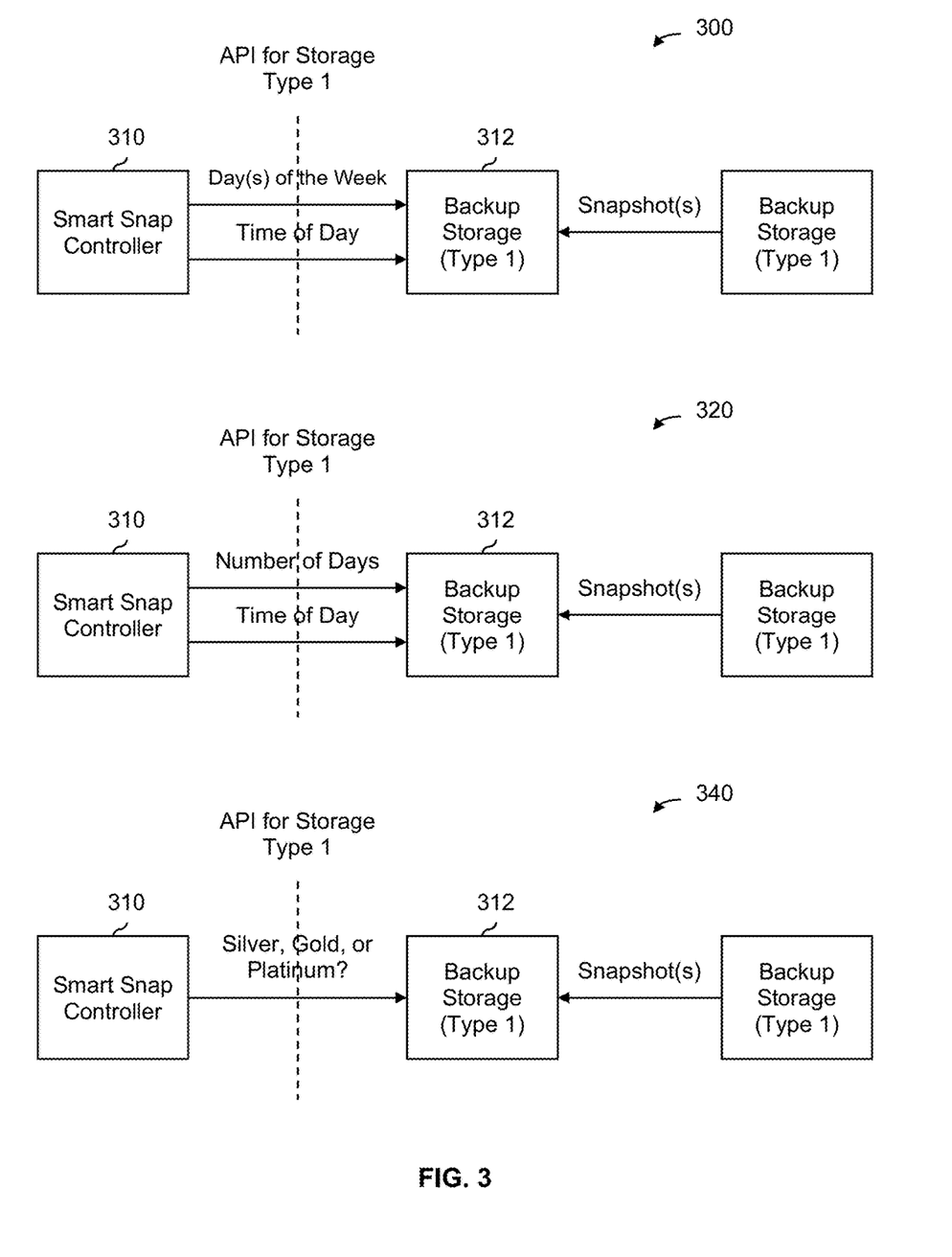
FIG. 3 is a diagram illustrating some embodiments of a smart snap controller configuring backup storage to take snapshots of a protected device.

The following figure illustrates some examples of a smart snap controller configuring backup storage to take snapshots of a protected device.

FIG. 3 is a diagram illustrating some embodiments of a smart snap controller configuring backup storage to take snapshots of a protected device. These interfaces are merely exemplary and are not intended to be limiting.

In diagram 300, smart snap controller 310 configures backup storage 312 with one or more days of the week (e.g., Monday, Tuesday, etc.) on which to take a snapshot of the protected device, as well as a time of day at which to take the snapshot. This is one example of a snapshot schedule.

In diagram 320, smart snap controller 310 configures backup storage 312 with the number of days between snapshots (e.g., 1 day between snapshots, 2 days between snapshots, etc.) and the time of day at which the snapshot should be taken. This is one example of a snapshot frequency.

In diagram 340, smart snap controller 310 configures backup storage 312 with selection of a degree of coverage. For example, silver coverage corresponds to the most infrequent snapshots of the three options, gold coverage corresponds to the second most (in)frequent snapshots of the three options, and platinum coverage corresponds to the most frequent snapshots of the three options. In this particular example, the API does not have a field or setting for specifying the time at which to take the snapshot (e.g., the storage device decides for itself when to take the snapshot). Diagram 340 shows another example of a snapshot frequency.

In some embodiments, a storage device offers other capabilities or services in addition to being able to automatically take snapshots of a protected device. The following figures show various examples of backup storage which have services or interfaces which support faster detection or identification of identical snapshots.

Figure 4:
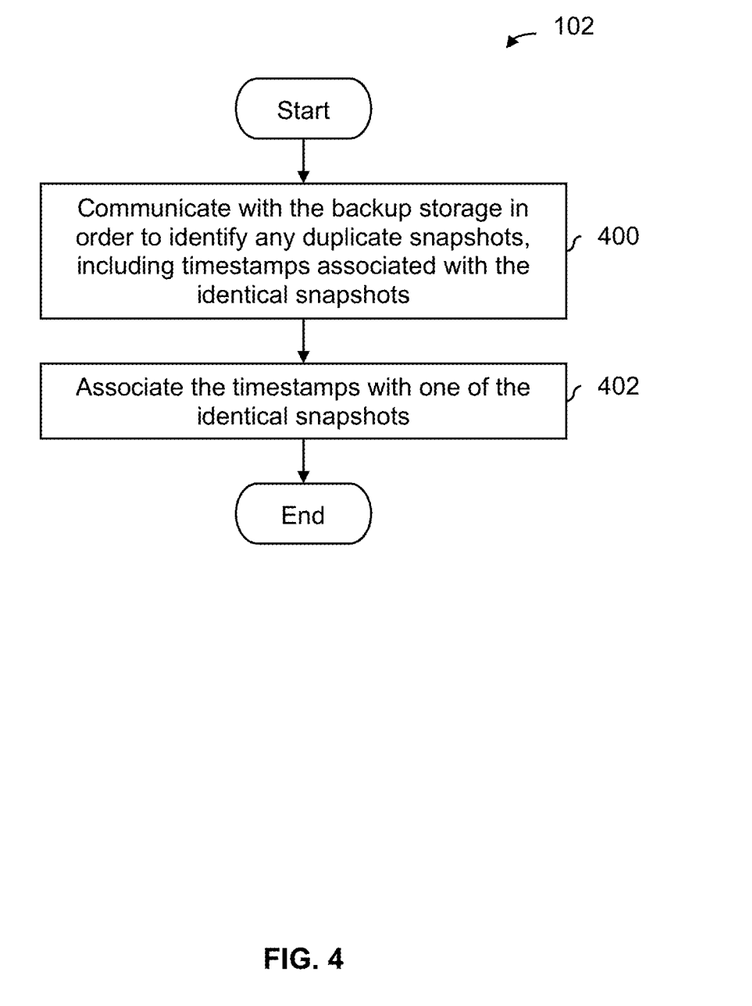
FIG. 4 is a flowchart illustrating an embodiment of a process to catalog metadata associated with a snapshot, including detection of identical snapshots.

FIG. 4 is a flowchart illustrating an embodiment of a process to catalog metadata associated with a snapshot, including detection of identical snapshots. As described above, in this example, the backup storage offers some service or interface which enables the smart snap controller to more quickly identify identical snapshots. In some embodiments, the process of FIG. 4 is used at step 102 in FIG. 2. In some embodiments, the process of FIG. 4 is performed by a smart snap controller.

At 400, the backup storage is communicated with in order to identify any identical snapshots, including timestamps associated with the identical snapshots. For example, suppose the protected device was in the same state on Monday as well as Tuesday and snapshots were taken on both those days at midnight, resulting in identical snapshots. In this example, step 400 would include identifying "Monday at midnight" and "Tuesday at midnight" as timestamps associated with the identical snapshots. Depending upon the API associated with a particular type of backup storage, the communication at step 400 may take a variety of forms. Some example are described in more detail below.

At 402, the timestamps are associated with one of the identical snapshots. As with step 400, this step may be implemented in a variety of ways depending upon how the backup storage is implemented. Generally speaking, associating two or more timestamps with a single instance of the identical snapshots enables other instances of the duplicate snapshot to be deleted, freeing up space on the backup storage. To continue the example from above, smart snap controller 204 in FIG. 2 may associate "Monday at midnight" and "Tuesday at midnight" with the Monday (Tuesday) snapshot on cataloged metadata table 202 so that if backup server 200 looks for the backup at Monday at midnight or the backup at Tuesday at midnight, both would point to or otherwise reference the Monday snapshot (e.g., stored on backup storage 210).

Returning to FIG. 4, in some embodiments, after step 402, the backup storage is instructed (e.g., if needed) to delete identical snapshots other than the one which the timestamps are associated with. With the metadata cataloged, the extraneous snapshots can be deleted from the backup storage. Some backup storage (e.g., with more intelligent and/or sophisticated capabilities) may automatically identify identical snapshots and may automatically delete any identified duplicate or identical snapshots in order to save space on the backup storage. Therefore, in some embodiments it may not be necessary to send a delete instruction to backup storage.

Figure 5:
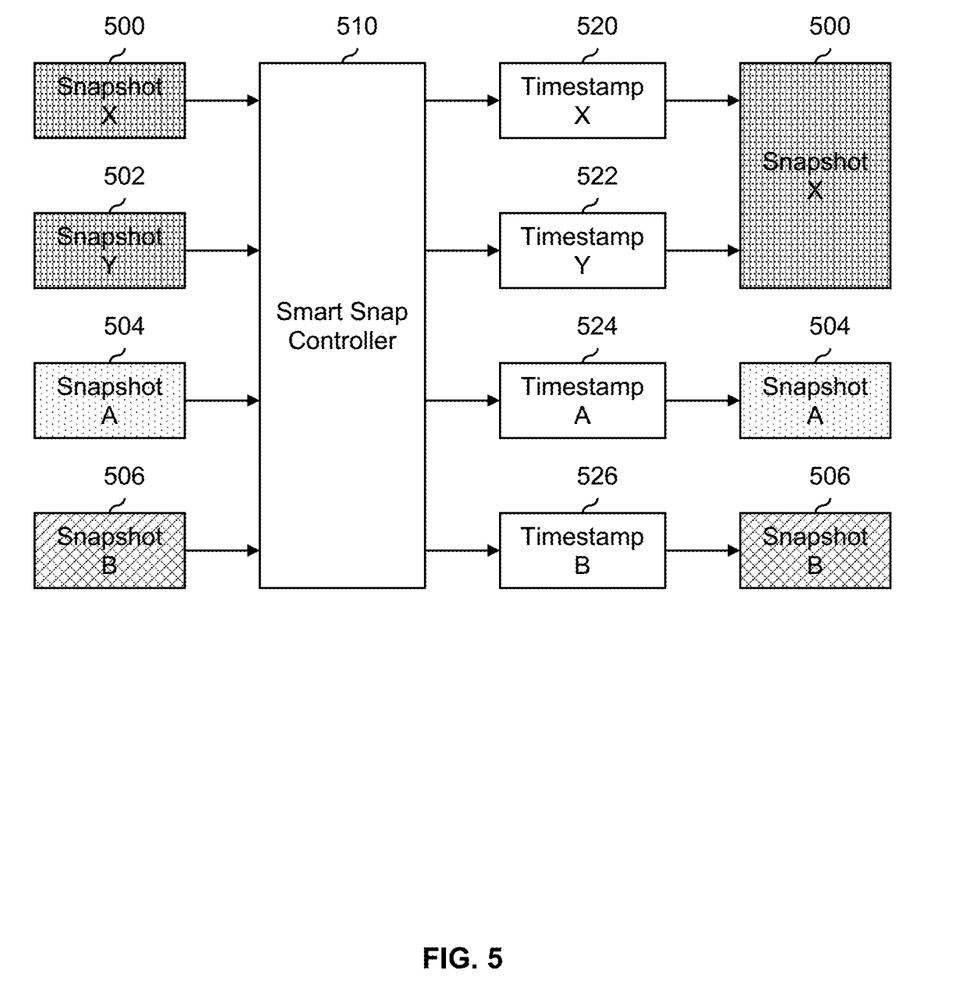
FIG. 5 is a diagram illustrating a conceptual example of a smart snap controller which identifies identical snapshots and associates the corresponding timestamps to a single one of the identical snapshots.

FIG. 5 is a diagram illustrating a conceptual example of a smart snap controller which identifies identical snapshots and associates the corresponding timestamps to a single one of the identical snapshots. In the example shown, snapshot X (500) and snapshot Y (502) are identical because the protected device did not change between the times when those two snapshots were taken. As such, both are shown with the same grid pattern. Snapshot A (504) and snapshot B (506) are different from the other snapshots shown and are therefore shown with a dotted pattern and a cross-hatched pattern, respectively.

Smart snap controller 510, with the assistance of the storage device (not shown), determines which of the snapshots are identical. It is noted that although the figure shows arrows from each of the snapshots to smart snap controller 510, most of the "heavy lifting" associated with identifying identical snapshots is done by the storage device and not the smart snap controller. This (as an example) obviates the need for the smart snap controller to read back two snapshots being compared and compare the two (e.g., using a hash) to decide whether those two snapshots are identical. This makes the process of identifying identical snapshots faster and/or less resource intensive.

After identifying snapshots X (500) and Y (502) as identical snapshots, smart snap controller 510 associates timestamp X (520) (which is the time at which snapshot X (500) was taken) and timestamp Y (522) (which is the time at which snapshot Y (502) was taken) with snapshot X (500). For example, these associations may be recorded in cataloged metadata table 202 in FIG. 2. It is noted that snapshot X (500) in the rightmost column is shown larger than snapshot X (500) in the leftmost column purely for aesthetical reasons. Subsequently, snapshot Y (502) may be deleted on the backup storage (not shown).

Snapshots A (504) and B (506) are identified as unique snapshots by smart snap controller 510 with the assistance of the storage device. As such, smart snap controller 510 associates timestamp A (524) (which is the time at which snapshot A (504) was taken) with snapshot A (504) and timestamp B (526) (which is the time at which snapshot B (506) was taken) with snapshot B (506). As described above, these associations may be recorded in a cataloged metadata table which both a backup server and the smart snap controller have access to.

Figure 6:
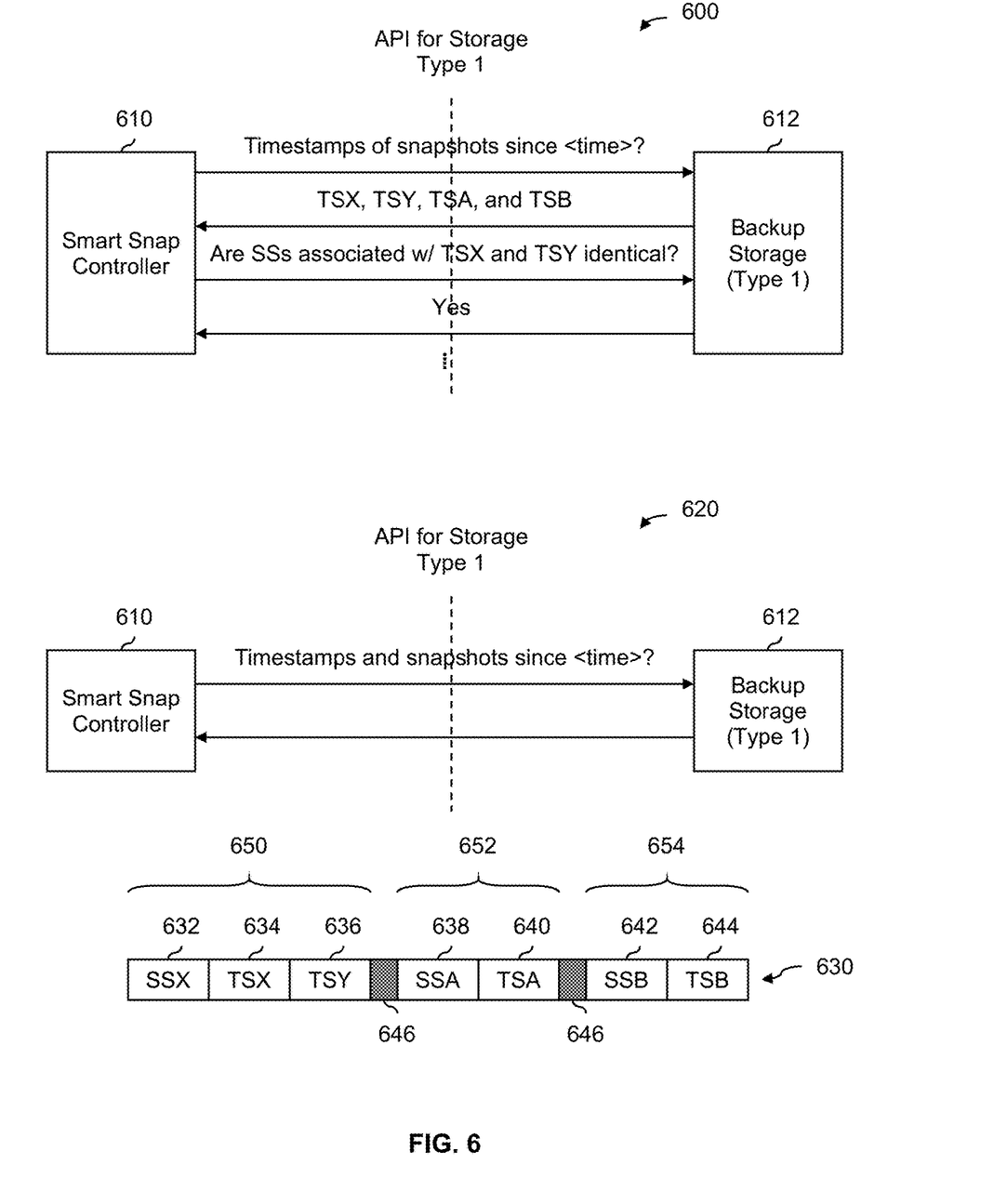
FIG. 6 is a diagram illustrating two embodiments of communications between a smart snap controller and backup storage to identify identical snapshots.

The following figure illustrates some examples of how the backup storage makes identification of duplicate or identical snapshots easier and/or faster for the smart snap controller. Naturally, the services and/or interfaces offered by backup storage may be implemented in a variety of ways and the following figure is merely exemplary and is not intended to be limiting.

FIG. 6 is a diagram illustrating two embodiments of communications between a smart snap controller and backup storage to identify identical snapshots. These examples continue the example from above where the snapshots taken at time X and Y are identical and the snapshots taken at time A and B are unique.

Diagram 600 shows a first example where the backup storage offers a simpler interface in which the smart snap controller must explicitly ask whether two snapshots (in this example, identified using their corresponding timestamps) are identical. First, smart snap controller 610 askes backup storage 612 for the timestamps of snapshots taken since a specified time (e.g., the last time cataloging was performed). Backup storage 612 returns timestamp X (TSX), timestamp Y (TSY), timestamp A (TSA), and timestamp B (TSB).

Smart snap controller 610 then selects the two earliest timestamps (i.e., timestamp X and timestamp Y) and asks backup storage 612 if the snapshots associated with those two timestamps are identical. Backup storage 612 responds in the affirmative (see FIG. 5). Smart snap controller 610 then proceeds to ask about other pairs of timestamps. In some applications, the likelihood of two non-consecutive snapshots being identical (without the intervening snapshot(s) being identical) is very small. For example, it may be highly unlikely that a snapshot taken at time I is not identical to a snapshot taken later on at time J, but is identical to a timestamp taken at an even later time (K). This would require the protected device to change states and then return exactly or precisely to the previous state. As such, in some embodiments (e.g., where this assumption hold), smart snap controller 610 only asks about consecutive pairs, such as (X, Y), (Y, A), and (A, B) as opposed to all possible pairs including non-consecutive pairs (e.g., (X, A) or (Y, B)). Inquiring about only consecutive pairs may be desirable because it reduces the number of inquiries, which improves performance.

In this particular example, timestamps are used in the query to the backup storage to identify identical snapshots, but in some other embodiments an identifier associated with a snapshot is used. It may be desirable to use whichever identifier is shorter (e.g., so that less I/O and network resources are consumed); naturally, this is implementation specific.

Diagram 620 shows a second example in which the backup storage offers a more sophisticated interface. In this example, smart snap controller 610 asks backup storage 612 for the timestamps and snapshots (e.g., some identifier, not necessarily the actual backed-up data which comprises the snapshot) since some specified time (e.g., the last time the metadata was cataloged). Backup storage 612 sends response 630 to smart snap controller 610.

Response 630 includes three segments: 650, 652, and 654. Each segment begins with an identifier of the relevant snapshot (e.g., SSX (632) for segment 650). The identifier may be a unique number or some address, link, or reference to the snapshot in the backup storage. After the snapshot identifier, each response further includes one or more timestamps associated with that snapshot. If there are two or more timestamps, then the storage device took identical or duplicate snapshots at the specified times. If there is only a single timestamp, then that snapshot is unique. To put it another way, the backup storage clearly identifies those timestamps which correspond to identical snapshots. Segment 650, for example, includes snapshot identifier SSX (632), timestamp X (634), and timestamp Y (636). This means that the backup storage took identical snapshots at time X and Y and the state of the protected device (e.g., captured in snapshot X) was the same at those two times.

Segments 652 and 654 include snapshot identifier SSA (638) and timestamp A (640) and snapshot identifier SSB (642) and timestamp B (644), respectively. This indicates that those two snapshots are unique (at least within the set comprising X, Y, A, and B).

In this particular example, dividers (646) separate or otherwise divide segments 650, 652, and 654. In some embodiments, the dividers are implied. For example, snapshot identifiers may have values within one range and timestamps may have values within another range so that when parsing a message or communication, it can be detected when a snapshot identifier is being read, and thus when a new segment begins.

Compared to some other systems, the performance may be improved using the techniques described above. For example, it may be more efficient for the backup storage to be the one that does the "heavy lifting" when identifying identical snapshots since the snapshots are already stored on the backup storage and therefore they do not need to be transferred or ingested across any I/O or network connection. Since some snapshots may be very large, this is desirable.

Another benefit is that some other systems do not even attempt to identify identical snapshots. In such systems, snapshots get piled up without the system ever trying to decide whether it needs all of those snapshots or not. In contrast, the process described above does identify identical snapshots and thus can more efficiently make use of the backup storage.

Figure 7:
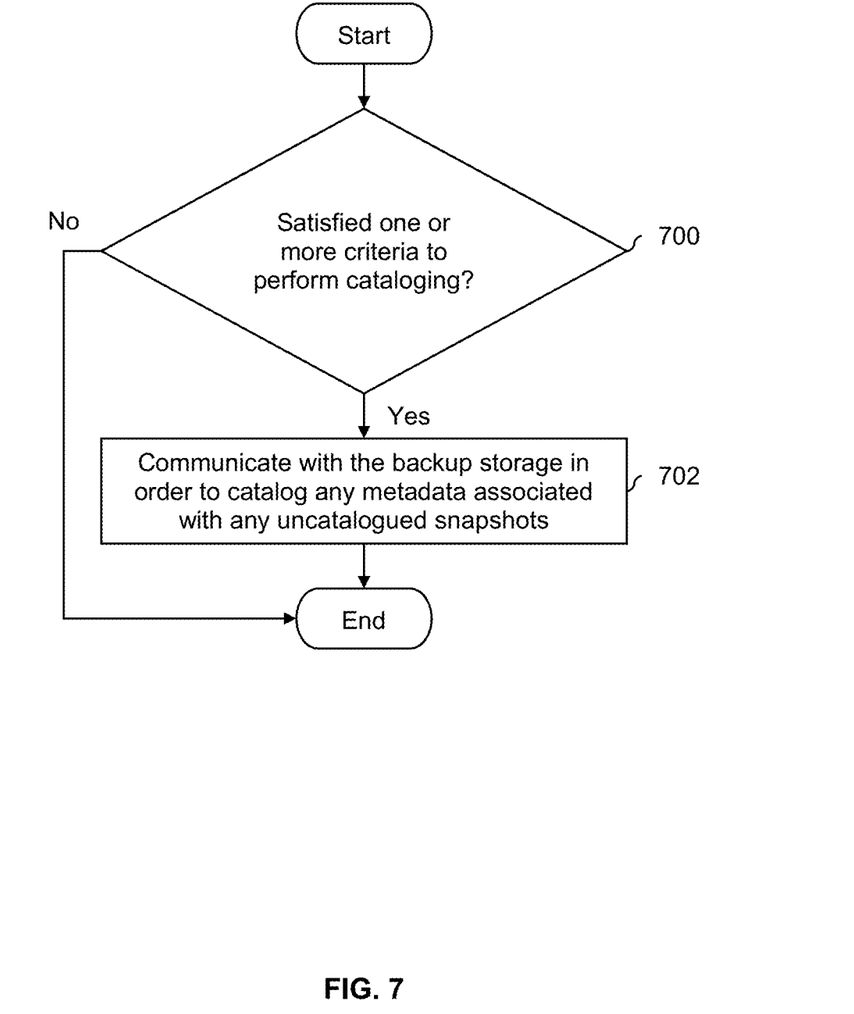
FIG. 7 is a flowchart illustrating an embodiment of an event-driven cataloging process.

In some embodiments, it may be desirable for the process of FIG. 1 to further include event-triggered cataloging. For example, suppose that (e.g., per the cataloging frequency or cataloging schedule) it is not yet time to perform cataloging and there is one uncatalogued snapshot. If a user were to inquire about available backups/snapshots or to start a backup and/or restore application, it may be desirable for the system to immediately catalogue that single, uncatalogued snapshot. The following figure describes one such example.

FIG. 7 is a flowchart illustrating an embodiment of an event-driven cataloging process. In some embodiments, the process of FIG. 7 is performed in combination with the process of FIG. 1.

At 700, it is decided whether one or more criteria to perform cataloging are satisfied. For example, the criteria may be some state that precedes a request from a user to display all available backups, such as a backup and/or restoration application being started (e.g., because in order for that request to be submitted, the backup and/or restoration application would need to be running). In some embodiments, such a backup and/or restoration application is started on backup server 200, protected device 200 or some other device not shown in FIG. 2. In another example, the criteria at step 700 may be when a user actually submits a request to display all available backups/snapshots.

If it is decided at step 700 that the criteria has been satisfied, then at 702 the backup storage is communicated with in order to catalog any metadata associated with any uncatalogued snapshots. To put it another way, cataloguing would be performed even though it is not necessarily the time to catalog (e.g., as prescribed or dictated by the cataloging schedule or cataloging frequency).

If it is decided at step 700 that the criteria has not been satisfied, then the process ends. Naturally, the process may be repeated so that the system periodically or continually checks whether the criteria has been satisfied.

In the example of FIG. 2, backup server 200 may send a "perform cataloging" signal (not shown in FIG. 2) to smart snap controller 204 when the criteria at 700 is satisfied. Once cataloging is complete, smart snap controller 204 may send a "cataloging complete" signal (not shown in FIG. 2) to backup server 200 so that backup server 200 knows to access cataloged metadata table 202.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled with the processor, wherein the memory is configured to provide the processor with instructions which when executed cause the processor to:
   use a smart snap controller to configure backup storage to automatically take one or more snapshots of a protected device, wherein the smart snap controller configures the backup storage, including by:
      selecting, from a plurality of application program interfaces, an application program interface for the backup storage based at least in part on the type of the backup storage; and
      using the selected application program interface to configure a snapshot schedule in the backup storage that is associated with one or more times at which to automatically take a snapshot of the protected device; and
   use the smart snap controller to communicate with the backup storage according to a cataloging schedule in order to generate cataloged metadata associated with any uncatalogued snapshots of the protected device that have been automatically taken by the backup storage wherein:
      the cataloged metadata is sent from the smart snap controller to a cataloged metadata table associated with a backup server; and
      the cataloging schedule is based at least in part on the snapshot schedule such that there are at least two uncatalogued snapshots to be cataloged when the smart snap controller contacts the storage device to begin cataloging.

2. The system recited in claim 1, further comprising one or more of the following: the backup server, the backup storage, or the protected device.

3. The system recited in claim 1, wherein the communicating with the backup storage includes:
   communicating with the backup storage in order to identify any duplicate snapshots, including timestamps associated with the identical snapshots; and
   associating the timestamps with one of the identical snapshots.

4. The system recited in claim 3, wherein the association between the timestamps and said one of the identical snapshots is stored in the cataloged metadata table which is accessible to the backup server.

5. The system recited in claim 1, wherein the memory is further configured to provide the processor with instructions which when executed cause the processor to:
   determine whether one or more criteria to perform cataloging are satisfied; and
   in the event it is determined that the one or more criteria to perform cataloging are satisfied, communicating with the backup storage in order to catalog any metadata associated with any uncatalogued snapshots.

6. The system recited in claim 5, wherein it is determined that the one or more criteria to perform cataloging are satisfied in the event a backup and restore application, which accesses the cataloged metadata in the cataloged metadata table in order to determine what cataloged snapshots are available for restoration, is started on the backup server.

7. The system recited in claim 5, wherein it is determined that the one or more criteria to perform cataloging are satisfied in the event a request associated with displaying all catalog snapshots available for restoration is received.

8. A method, comprising:
   using a smart snap controller to configure backup storage to automatically take one or more snapshots of a protected device, wherein the smart snap controller configures the backup storage, including by:
      selecting, from a plurality of application program interfaces, an application program interface for the backup storage based at least in part on the type of the backup storage; and
      using the selected application program interface to configure a snapshot schedule in the backup storage that is associated with one or more times at which to automatically take a snapshot of the protected device; and
   using the smart snap controller to communicate with the backup storage according to a cataloging schedule in order to generate cataloged metadata associated with any uncatalogued snapshots of the protected device that have been automatically taken by the backup storage wherein:
      the cataloged metadata is sent from the smart snap controller to a cataloged metadata table associated with a backup server; and
      the cataloging schedule is based at least in part on the snapshot schedule such that there are at least two uncatalogued snapshots to be cataloged when the smart snap controller contacts the storage device to begin cataloging.

9. The method recited in claim 8, wherein the communicating with the backup storage includes:
communicating with the backup storage in order to identify any duplicate snapshots, including timestamps associated with the identical snapshots; and
associating the timestamps with one of the identical snapshots.

10. The method recited in claim 9, wherein the association between the timestamps and said one of the identical snapshots is stored in the cataloged metadata table which is accessible to the backup server.

11. The method recited in claim 8 further comprising:
determining whether one or more criteria to perform cataloging are satisfied; and
in the event it is determined that the one or more criteria to perform cataloging are satisfied, communicating with the backup storage in order to catalog any metadata associated with any uncatalogued snapshots.

12. The method recited in claim 11, wherein it is determined that the one or more criteria to perform cataloging are satisfied in the event a backup and restore application, which accesses the cataloged metadata in the cataloged metadata table in order to determine what cataloged snapshots are available for restoration, is started on the backup server.

13. The method recited in claim 11, wherein it is determined that the one or more criteria to perform cataloging are satisfied in the event a request associated with displaying all catalog snapshots available for restoration is received.

14. A computer program product, the computer program product being embodied in a non-transitory computer readable storage medium and comprising computer instructions for:
using a smart snap controller to configure backup storage to automatically take one or more snapshots of a protected device, wherein the smart snap controller configures the backup storage, including by:
selecting, from a plurality of application program interfaces, an application program interface for the backup storage based at least in part on the type of the backup storage; and
using the selected application program interface to configure a setting in the backup storage that is associated with one or more times at which to automatically take a snapshot of the protected device; and
using the smart snap controller to communicate with the backup storage according to a cataloging schedule in order to generate cataloged metadata associated with any uncatalogued snapshots of the protected device that have been automatically taken by the backup storage wherein:
the cataloged metadata is sent from the smart snap controller to a cataloged metadata table associated with a backup server; and
the cataloging schedule is based at least in part on the snapshot schedule such that there are at least two uncatalogued snapshots to be cataloged when the smart snap controller contacts the storage device to begin cataloging.

15. The computer program product recited in claim 14, wherein the communicating with the backup storage includes:
communicating with the backup storage in order to identify any duplicate snapshots, including timestamps associated with the identical snapshots; and
associating the timestamps with one of the identical snapshots.

16. The computer program product recited in claim 15, wherein
the association between the timestamps and said one of the identical snapshots is stored in the cataloged metadata table which is accessible to the backup server.

17. The computer program product recited in claim 14 further comprising computer instructions for:
determining whether one or more criteria to perform cataloging are satisfied; and
in the event it is determined that the one or more criteria to perform cataloging are satisfied, communicating with the backup storage in order to catalog any metadata associated with any uncatalogued snapshots.

18. The computer program product recited in claim 17, wherein it is determined that the one or more criteria to perform cataloging are satisfied in the event a backup and restore application, which accesses the cataloged metadata in the cataloged metadata table in order to determine what cataloged snapshots are available for restoration, is started on the backup server.

19. The computer program product recited in claim 17, wherein it is determined that the one or more criteria to perform cataloging are satisfied in the event a request associated with displaying all catalog snapshots available for restoration is received.

* * * * *